(12) United States Patent
Stubler et al.

(10) Patent No.: US 11,225,013 B2
(45) Date of Patent: Jan. 18, 2022

(54) METHOD FOR REPAIRING A CIVIL ENGINEERING STRUCTURE

(71) Applicant: SOLETANCHE FREYSSINET, Rueil-Malmaison (FR)

(72) Inventors: Jérôme Stubler, Paris (FR); Julien Erdogan, La Garenne-Colombes (FR); Philippe Zanker, Le Coudray (FR)

(73) Assignee: SOLETANCHE FREYSSINET, Rueil-Malmaison (FR)

( * ) Notice: Subject to any disclaimer, the term of this patent is extended or adjusted under 35 U.S.C. 154(b) by 0 days.

(21) Appl. No.: 16/319,918

(22) PCT Filed: Jul. 17, 2017

(86) PCT No.: PCT/EP2017/068050
§ 371 (c)(1),
(2) Date: Jan. 23, 2019

(87) PCT Pub. No.: WO2018/019644
PCT Pub. Date: Feb. 1, 2018

(65) Prior Publication Data
US 2019/0270239 A1    Sep. 5, 2019

(30) Foreign Application Priority Data
Jul. 27, 2016   (FR) ..................... 1657241

(51) Int. Cl.
*B29C 64/106* (2017.01)
*B29C 64/205* (2017.01)
(Continued)

(52) U.S. Cl.
CPC .......... *B29C 64/106* (2017.08); *B29C 64/205* (2017.08); *E04C 5/12* (2013.01);
(Continued)

(58) Field of Classification Search
USPC .. 156/60, 63, 64, 71, 94, 98, 166, 184, 185, 156/189, 190, 242, 244.11, 244.12, 278,
(Continued)

(56) References Cited

U.S. PATENT DOCUMENTS 3,810,709 A * 5/1974 Weaver ................... B06B 1/164
404/93
4,993,913 A * 2/1991 Ohtsuki ..................... B25J 5/00
414/729
(Continued)

FOREIGN PATENT DOCUMENTS

JP   2005299236 A   10/2005
JP   2016037808     3/2016
(Continued)

OTHER PUBLICATIONS

Corresponding International Application, Application No. PCT/EP2017/068050 Search Report, dated Oct. 23, 2017, 4 pgs.

*Primary Examiner* — Philip C Tucker
*Assistant Examiner* — Brian R Slawski
(74) *Attorney, Agent, or Firm* — Cooper Legal Group, LLC; Ronald M. Kachmarik (57) ABSTRACT

A repair method for a civil engineering work. The method includes the depositing, directly onto a portion of the work to be repaired, of a reinforcing structure formed from one or more successive layers of at least one reinforcing material which are each extruded in contact with the surface onto which the material is to be deposited, using a robot system, with the material being extruded in strips.

40 Claims, 4 Drawing Sheets

(51) Int. Cl.
| | |
|---|---|
| *E04C 5/12* | (2006.01) |
| *E04G 21/04* | (2006.01) |
| *E04G 21/12* | (2006.01) |
| *E04G 23/02* | (2006.01) |
| *B33Y 10/00* | (2015.01) |
| *B33Y 30/00* | (2015.01) |
| *B29C 70/38* | (2006.01) |
| *B29C 48/92* | (2019.01) |
| *B29C 65/48* | (2006.01) |
| *B29C 73/02* | (2006.01) |
| *B29C 70/06* | (2006.01) |
| *B29C 65/52* | (2006.01) |
| *B29C 64/393* | (2017.01) |
| *B29C 64/165* | (2017.01) |

(52) U.S. Cl.
CPC ......... *E04G 21/0418* (2013.01); *E04G 21/12* (2013.01); *E04G 23/0218* (2013.01); *B29C 48/92* (2019.02); *B29C 64/165* (2017.08); *B29C 64/393* (2017.08); *B29C 65/488* (2013.01); *B29C 65/4885* (2013.01); *B29C 65/525* (2013.01); *B29C 70/06* (2013.01); *B29C 70/38* (2013.01); *B29C 73/025* (2013.01); *B33Y 10/00* (2014.12); *B33Y 30/00* (2014.12)

(58) Field of Classification Search
USPC ...... 156/307.1, 307.3, 307.7, 314, 319, 324, 156/349, 350, 356, 367, 378, 379, 500, 156/501, 538, 574, 575; 52/86, 87, 88, 52/741.1, 741.3, 741.41, 742.1, 742.13, 52/742.14, 742.16, 514, 514.5; 427/403, 427/407.1; 264/31, 32, 34, 36.1, 36.18, 264/36.2
See application file for complete search history.

(56) References Cited

U.S. PATENT DOCUMENTS

| | | | |
|---|---|---|---|
| 6,507,163 B1 * | 1/2003 | Allen | B25J 9/162 14/78 |
| 8,825,208 B1 * | 9/2014 | Benson | E04F 21/02 700/245 |
| 8,965,571 B2 * | 2/2015 | Peters | B66F 11/04 700/245 |
| 9,322,508 B2 * | 4/2016 | Mullins | B32B 37/0046 |
| 10,207,412 B2 * | 2/2019 | Kullborg | B25J 5/007 |
| 2002/0110680 A1 * | 8/2002 | Bank | E04G 23/0218 428/297.4 |
| 2014/0356529 A1 * | 12/2014 | Goodell | F16L 55/1655 427/236 |
| 2014/0374935 A1 * | 12/2014 | Flitsch | B29C 67/0088 264/40.1 |
| 2016/0221278 A1 * | 8/2016 | Siegfried Herrmann | B29C 69/001 |
| 2018/0071949 A1 * | 3/2018 | Giles | B28B 17/0081 |

FOREIGN PATENT DOCUMENTS

| | | | | |
|---|---|---|---|---|
| NL | 9300342 A | * | 9/1994 | ......... E04F 21/1652 |
| WO | WO-2016063074 A2 | * | 4/2016 | ......... B05B 13/0431 |

* cited by examiner

METHOD FOR REPAIRING A CIVIL ENGINEERING STRUCTURE

The present invention relates to the reinforcing of civil engineering works, in particular civil engineering buildings or works such as the arched roofs of tunnels, bridges, pipes, etc, the term "civil engineering" here encompassing all types of constructions, whatever their purpose.

It may be necessary to reinforce these works during their lifetime, for example in order to compensate for their ageing structure.

It is customary to deploy structural reinforcements using techniques which are defined below.

One of the common methods consists in sheathing all or part of an element of the structure by installing one or more metal reinforcements. This technique requires, on the one hand, any gaps between the contact surfaces of the structure to be strengthened and the reinforcement employed to be filled and, on the other hand, the production of rigid inclusions connecting the existing structure to the reinforcement. The difficulty with this technique resides in particular in:

the significant resources required for it to be deployed on site, which make use of personnel and handling and injection equipment;

the limited ability to produce reinforcements with variable and accurate dimensions;

the quality of the continuity of the contact between the reinforcement and the structure to be strengthened.

A second currently used method consists in sheathing all or part of an element of the structure by installing a concrete reinforcement in the form of a shell or girder. This technique can require reinforcing cages, which may or may not be anchored in the existing structure, to be installed manually and formwork to be used before the concrete is put in place. The concrete is put in place in the traditional fashion using a concrete pump, by spraying, or by an element prefabricated before installation. The difficulty with this technique resides in particular in:

the resources required for it to be deployed on site which make use of personnel, handling equipment, and formwork;

the great difficulty in producing reinforcements with variable dimensions along the structure.

A third method consists in applying reinforcements based on composite materials in the form of mats, strips, or rods to the existing structure by manually gluing them. By way of example, the composite materials currently used are materials consisting of carbon fibers impregnated with an epoxy matrix. Such a method makes it possible to increase the tensile and shear strength of the elements of the existing structure but provides only little advantage in terms of an increase in their inertia.

These three techniques are sometimes combined.

Moreover, it is known in the building field to produce concrete structures using a technique similar to 3D printing with the aid of an extrusion head pilot-controlled from numerical data. The head is moved in successive planes of increasing height by a robot arm in order to extrude successive layers of the construction material according to the geometry to be produced. One layer is not deposited on the preceding one depending on the real-time acquisition of data relating to the relief of that portion of the work that has already been produced but depending on a 3D virtual mesh of the structure to be produced which is stored in a memory.

Patent application JP 2016 37808 discloses a system comprising a repair robot provided for repairing a tunnel, for example. This robot comprises means for digging out a crack and injecting an epoxy resin or a mortar into it with the aid of an injection nozzle. Such a robot has relatively limited possibilities in terms of repairing a work because in some cases the repair operations require much more than simply filling cracks.

Patent application JP 2005-299236 describes a robot system which also has the purpose of performing repairs. The repair material is delivered by a nozzle at a distance from the wall of the work to be repaired and applied against the wall by a pressing member associated with the nozzle. Such a system is not provided for applying successive layers of the repair material and does not allow the thickness of the material deposited to be varied to a great extent. Now some zones may require a greater degree of strengthening than others.

The object of the present invention is to overcome all or some of the abovementioned disadvantages of the usual repair methods and does so by virtue of a repair method for a civil engineering work, comprising the depositing, directly onto a portion of the work to be repaired, of a reinforcing structure formed from one or more successive layers of at least one reinforcing material, in particular in the form of strips which are each extruded in contact with the surface onto which the material is to be deposited, using a robot system.

"Contact extrusion" should be understood to mean that the outlet orifice of the nozzle through which the material exist is situated close to the surface on which the material is deposited, at a distance which is preferably in the order of the thickness of the deposited layer.

The invention makes it possible to easily reinforce civil engineering structures by applying thereon by extrusion multiple layers of a reinforcing material using a robot system, the latter preferably being pilot-controlled in real time by means which enable precise positioning relative to the work.

The reinforcing material can be extruded in a strip with a relatively constant dimension, in successive adhesive layers, so as to form the desired geometry. The level of the finishing can be adapted as needed.

The reinforcement formed by the extrusion of material can thus have a constant, flat, or projecting profile so as to optimize the quantity of reinforcing material used and be adapted to structural requirements and to the clearance conditions imposed by its use. The reinforcing structure can in particular be a variable-inertia ribbed shell or a variable-inertia ribbed girder.

Extrusion Head

The material is deposited with the aid of at least one extrusion head of the robot system.

It is advantageous if the extrusion head has a nozzle having a slot-shaped outlet orifice for the material. In this case, the nozzle can be moved in a direction perpendicular to the longitudinal axis of the slot. Other forms of outlet orifices are nevertheless possible.

The extrusion head can have a single nozzle or multiple nozzles.

The extrusion head is preferably arranged so as to deposit the material in the form of a strip.

The extrusion head is supplied by the material at a pressure sufficient to eject it via the outlet orifice of the nozzle.

Where appropriate, the extrusion head comprises a feed of reinforcing fibers which can be mixed in the extrusion head with base formulation of the material, in particular a cement-based formulation. The extruded material can also be prepared by introducing fibers upstream from the extrusion head.

The extrusion head can be equipped with all feed ducts for fluids for cleaning and/or rinsing the nozzle.

Acquisition of Relief Data

The method according to the invention preferably comprises the acquisition of relief data of the zone onto which the material is to be deposited and the automatic pilot-controlling of the extrusion head at least based on these relief data.

"Relief data" should be understood to mean data which provide information on the location of the surface on which the material is to be deposited relative to a known reference system of the robot system, such that the nozzle may be brought automatically into the appropriate position for depositing the material during extrusion.

The data can be 3D relief data, i.e. a spatial mesh is produced of the surface in question in the three dimensions of an orthonormal coordinate system. They may also be a succession of 2D scans in the planes of section spaced apart along the work, or even 1D scans along a girder, for example, so as to control the spacing between the nozzle and the surface onto which the material is to be deposited.

The relief data may be acquired with the aid of an acquisition system corresponding to the robot system, carried for example by the same robot arm as the extrusion head.

The acquisition of the relief data may comprise the acquisition of relief data in real time, simultaneously with the extrusion. These data may be used to position the extrusion head so as to orient it appropriately in order to deposit different successive layers of the material and to allow it to move relative to the work.

The acquisition of the relief data may in particular make it possible to maintain the nozzle at a predefined distance from the surface on which the material is to be deposited; this can be the surface of the work during the depositing of the first layer, or the surface of a previously deposited layer of material.

The acquisition of the relief data may also comprise the acquisition of relief data prior to extrusion.

It is possible, in an exemplary embodiment of the invention, to provide on the robot system an acquisition system which is used a first time in order to perform a scan of the portion of the work to be repaired, without depositing the material. This first acquisition may in particular be useful for calculating an optimum trajectory to be followed by the extrusion head, taking into account the form to be given to the reinforcing structure; once the trajectory has been calculated, the acquisition system can continue to be used in order to establish the position of the nozzle relative to the work and/or to reposition itself relative to the latter. This makes it possible to finely control the depositing of the different layers, in particular by maintaining the nozzle at the required distance from the depositing surface and with the desired orientation.

This acquisition may also take place using a corresponding acquisition system separate from the robot system.

The relief data may be acquired with the aid of at least one optical sensor by scanning with ultrasound or millimetric waves, and or with the aid of at least one mechanical probe. One or more cameras may be used, optionally with fringe projection, or a remote-controlled laser or ultrasound device, or a millimetric-wave radar, for example a Lidar-type radar.

When appropriate, the work is also surveyed at depth, for example simultaneously with the acquisition of the relief, for example in order to identify flaws in said work. When a radar is used to scan the surface, this radar can also be used to scan the thickness of the work. Where appropriate, these additional data are used to adapt the form of the reinforcing structure so as to, for example, thicken it in the zones where flaws have been detected. Real-time detection of flaws may be useful, for example, when inspecting a very long pipe and when preventively reinforcing zones where a potential weakness has been detected.

Reinforcing Structure

The number of layers deposited depends on the thickness to be given locally to the reinforcing structure and may lie, for example, between 1 and 100, preferably between 2 and 100. In particular, when the thickness to be given to the reinforcing structure is minimal, the number of layers may be 1, the number of layers being greater when the thickness of the reinforcing structure is not minimal. The reinforcing structure may comprise at least one portion where the number of superposed extruded layers is greater than 1.

The thickness of each layer depends on the rheology of the material and on its setting speed. It lies, for example, between 1 and 30 mm.

When the material is deposited in strips, the width of each strip lies between 3 and 50 mm.

The extrusion head is preferably guided so as to respect a preprogrammed algorithm for the reinforcing material so as to give the reinforcing structure its desired form. This algorithm may, where appropriate, take into account the creep of the material.

The aim of this algorithm may be, for example, to produce a reinforcing structure with a constant thickness along the portion of the work to be reinforced.

However, the method according to the invention makes it possible to easily produce a reinforcing structure with an optimum form which makes it possible to afford the required reinforcement, taking into account the stresses to which the work is exposed, whilst minimizing the quantity of material used.

The repair method may comprise smoothing the structure before it sets with the aid of a tool of the robot system, in particular a spreading blade. It is preferably a tool carried by the same arm of the robot system as the extrusion head.

This smoothing can take place only after the outermost layer has been deposited; as an alternative, one or more smoothing actions take place between the depositing of successive layers. Where appropriate, uneven depositing of the material may be detected automatically and a smoothing action is then initiated. This uneven depositing may be detected, for example, after acquiring a relief of the zone onto which the material is deposited.

The number of layers deposited and/or the thickness of the layers deposited may vary so as to produce a reinforcing structure with an inertia that varies. It is thus possible to minimize the quantity of material deposited whilst supplying the required reinforcement.

The reinforcing structure may be ribbed, the ribs being oriented longitudinally or transversely or in an intermediate direction, as required.

The reinforcing structure may be a girder which lies against for example, a face of a girder of the work to be reinforced, along at least part of the latter.

The reinforcing structure may also be a shell, in particular when reinforcing a dome-shaped or arched roof, for example of a tunnel.

The reinforcing structure may also be an anchor knob for distributing concentrated force, such as an anchor block for cables and/or tendons, in particular an anchor knob for additional prestressing cables, for deviating external prestressing cables, support cables, or cables for anchoring damping devices. Such knobs are used in particular on civil engineering works such as bridges.

The reinforcing structure may be produced with one or more blockouts by adapting the location of the deposited layers. Such blockouts are used, for example, for installing inserts, prestressing bars for strapping to the existing structure, plugs, or guides, and in particular cables.

Moving the Extrusion Head

The robot system can move independently, comprising for example a self-propelled platform.

As an alternative, the robot system comprises a platform which is pulled.

The robot system can move on wheels, tracks, cables, or skids.

It may be advantageous, when possible, for example when reinforcing a girder, to ensure that the work contributes to guide the robot system mechanically as it moves along the work when producing the reinforcing structure.

The guiding may take place, for example, by pressing the robot system against at least one surface of the work, in particular at least one surface defined by a girder of the work, for example multiple surfaces of the work including two opposite surfaces. The robot system thus moves along the girder, guided by the latter, and deposits the reinforcing material as it advances on the girder.

The accuracy of the depositing of the reinforcing structure is preferably greater than +/−0.5 cm in terms of thickness and/or in a direction parallel to the underlying surface of the work.

Reinforcing Material

The material used has a rheology which is compatible with its extrusion and the depositing of superposed layers, in particular in the form of strips.

The setting time for the material is preferably sufficiently long that a layer is deposited on a previously deposited layer before said previously deposited layer has set completely; maximum adhesion between the layers is thus guaranteed.

The extruded reinforcing material may be of different types.

It may, in particular, consist, depending on the structure in question and the reinforcement needs, of cement-based materials such as high-performance or ultra-high-performance concrete which may or may not be fiber-reinforced.

In the case of a structure to be reinforced which consists of a wooden framework, the reinforcing material used may consist of a mixture of resin and wood. The extruded material may thus comprise a resin.

Work to be Reinforced

The work to be reinforced pre-exists when the method according to the invention is implemented. The aim of the latter is to repair the work, i.e. to strengthen it by applying the reinforcing structure according to the invention.

The work to be reinforced may have been completed more than three months, six months, or a year before the method according to the invention is implemented.

The work may be an arched roof, in particular of a tunnel or a domed roof.

The work may also be a bridge, the portion of the work which needs to be repaired forming, for example, part of the deck of the bridge.

The invention also applies to the repairing of a hollow work such as a pipe, which may or may not be buried, or a mast, or a gallery which cannot be visited, the robot system preferably traveling along this pipe, this mastor this gallery, inside therein.

The work may also be made from masonry and the reinforcing structure which is deposited is used for repointing.

The majority of the work to be repaired may be made from concrete. The portion of the work to be repaired may also be made from metal or wood.

The subject of the invention is also a reinforcing structure which covers at least partially a civil engineering work, in particular a reinforcing structure in the form of a girder, shell, or knob, produced by implementing the method according to the invention.

The subject of the invention is also a civil engineering work which is repaired by installing on the work a reinforcing structure produced by implementing the method according to the invention.

The subject of the invention is also a robot system suitable for repairing a civil engineering work, comprising:

at least one extrusion head configured so as to form a reinforcing structure consisting of a reinforcing material directly on a portion of the work to be repaired, this reinforcing material preferably being a concrete, in particular a fiber-reinforced one, or comprising a resin, a system for acquiring relief data on the zone onto which the material is to be deposited, a calculator for automatically controlling the movements of the extrusion head relative to the work to be repaired, based on at least the relief data and the data about the form to be given on the work to the reinforcing structure, the movements of the extrusion head being controlled so as to extrude the material in successive layers, the extrusion of the material taking place in contact with the surface onto which the material is to be deposited.

This robot system may have all or some of the features described above in connection with the repair method according to the invention.

This robot system thus advantageously comprises:

an articulated arm carrying the extrusion head, in particular an arm with several degrees of freedom, a platform which can move along the work, in particular a self-propelled or pulled platform, mounted on wheels, tracks, cables, or skids, the movement of which is controlled by the calculator, a tool for smoothing the deposited structure before it sets, in particular in the form of a spreading blade, this tool preferably being carried by the same robot arm as the extrusion head, means for automatically orienting a nozzle of the extrusion head perpendicularly to the surface onto which the reinforcing material is deposited, the extrusion head preferably comprising a slot-shaped nozzle.

The invention will be better understood on reading the following description of non-limiting exemplary embodiments of said invention and on examining the attached drawings, in which.

Figure 1:
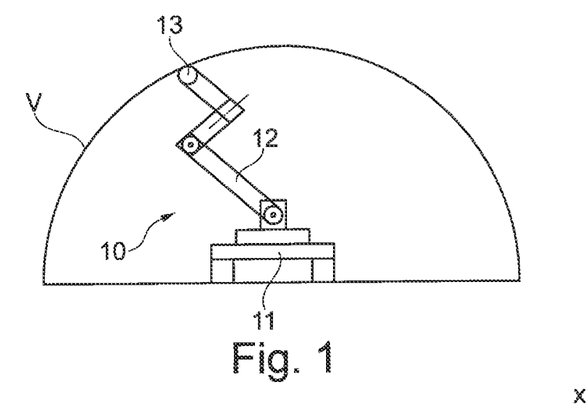
FIG. 1 shows schematically and partially an example of a robot system according to the invention, used when reinforcing an arched roof.

A first example of a motorized system 10 according to the invention, used to reinforce a civil engineering work comprising an arched roof V, for example that of a tunnel, is shown in FIG. 1.

The robot system 10 comprises a movable platform 11 which can move along the arched roof V.

The robot system 10 comprises an articulated arm 12 which may comprise one or more segments depending on the number of degrees of freedom required to produce the depositing of the material. This arm 12 may be articulated about an axis parallel to a generatrix of the arched roof.

In the example illustrated, the arm comprises three articulated segments but the invention encompasses all types of deformable and/or orientable structures adapted to the reinforcement operation to be performed.

The arm carries an extrusion head 13 which makes it possible to deposit multiple successive layers of a reinforcing material, for example a cement-based one.

Figure 2A:
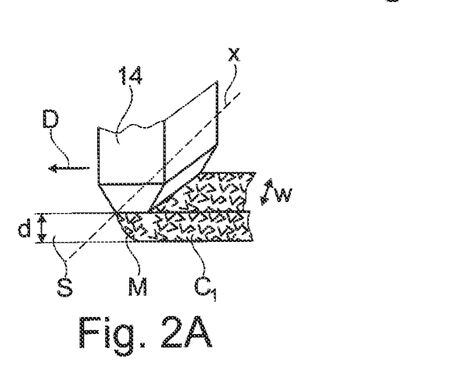
FIGS. 2A and 2B show separately schematically and partially the extrusion head during the extrusion of the material.

The extrusion head 13 comprises, as can be seen in FIG. 2A, a nozzle 14 through which the reinforcing material is extruded in a fluid state.

Figure 2B:
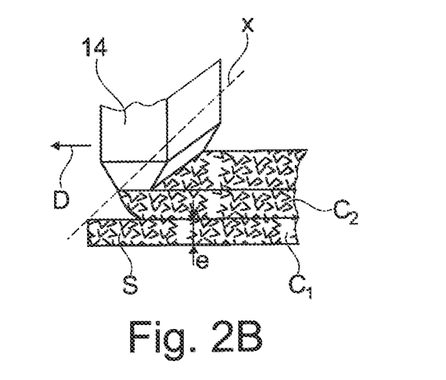

This extrusion takes place first, during a first pass of the extrusion head, in contact with the outer surface S of the work in order to form a first strip layer $C_1$, as illustrated in FIG. 2A, then, during a subsequent pass, in contact with the previously deposited layer $C_1$, in order to form the second strip layer $C_2$, as illustrated in FIG. 2B, and so on according to the number of layers to be deposited in order to form the desired reinforcing structure. A layer is preferably deposited on the previous layer before the setting of the previous layer is complete so as to have the best possible adhesion between the layers.

Figures 3, 4:
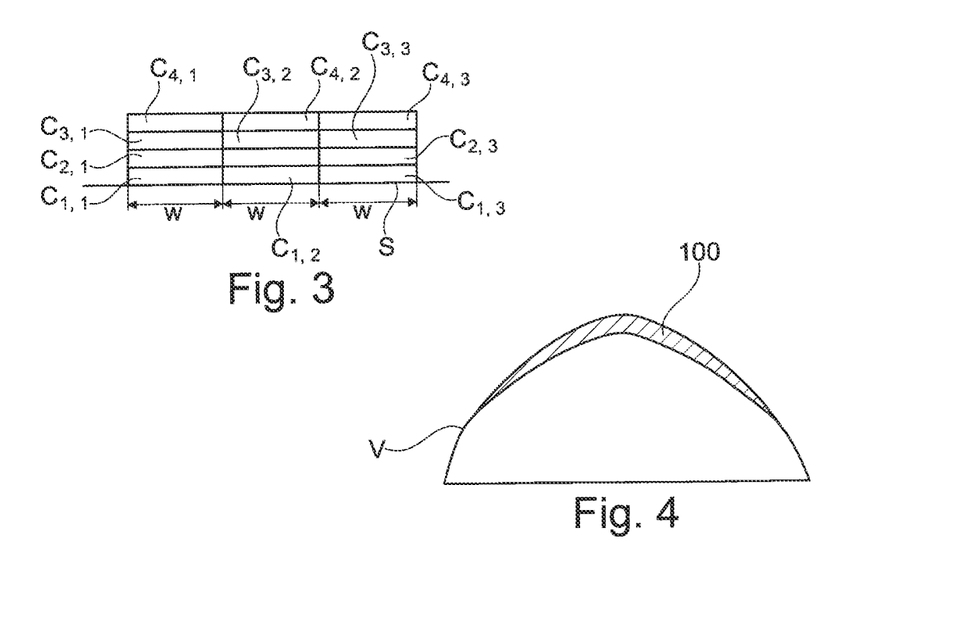
FIG. 3 illustrates the juxtaposition of stacks of extruded strips which have been superposed as the production of the reinforcing structure progresses.
FIG. 4 is an example of a reinforcing structure produced with the aid of the robot system in FIG. 1.

After a portion of the reinforcing structure has been formed of width w corresponding to that of a strip, the following portion is produced. This portion may be formed as an extension of the previous one, with no overlap of the strips, as illustrated in FIG. 3. When the successive strips are juxtaposed but the material has not set yet, the strips can join at their contact edges such that, after the material has set, the final reinforcing structure is continuous in a direction transverse to the strips. Three successive stacks in the longitudinal direction of the work have been shown in FIG. 3, each stack comprising four superposed strips of material, labeled $C_{1,1}$ to $C_{4,1}$ for the first stack, $C_{1,2}$ to $C_{2,4}$ for the second stack, and $C_{1,3}$ to $C_{4,3}$ for the third stack.

The outlet orifice of the nozzle 14 preferably has a cross-section of a shape that is elongated along a longitudinal axis X, for example is rectangular, this longitudinal axis X preferably being oriented perpendicularly to the direction D in which the nozzle 14 moves to deposit each of the layers in strips of reinforcing structure.

The thickness e of each layer which is deposited is, for example, substantially constant for each of the layers of the reinforcing structure and the number of deposited layers is adapted locally to give the reinforcing structure the desired thickness at each point.

e lies, for example, between 1 and 30 mm and the width w of the strips is between 3 and 50 mm. The thickness can depend on the rheology of the material used, and the thickness which is deposited is preferably chosen so that the layer adheres completely to the surface on which it is deposited without losing its cohesion.

The number of superposed layers locally depends on the thickness that the reinforcing structure needs to have at this point.

When extruding a layer, the distance d of the nozzle 14 from the surface onto which the material is deposited is preferably equal to e. This allows adhesion of the material to the surface on which it is deposited even when the extrusion takes place with the axis of the nozzle 14 pointing upward.

The extrusion head 13 is advantageously equipped with a seal (not shown) which closes when there is no extrusion, for example when the extrusion is locally interrupted because the reinforcing material has not been deposited, for example because the extrusion head 13 is too far from the work to extrude thereon the reinforcing material in contact with it or because the number of layers which has already been deposited corresponds to the desired thickness for the reinforcing structure in the zone where the nozzle 14 is situated.

The nozzle 14 is supplied with reinforcing material through each duct, the feed pressure of the reinforcing material being chosen depending on its rheology and on the outlet rate of the nozzle.

The reinforcing material is preferably pumped from a tank which can be stationary relative to the work, in which case a flexible pipe is provided between this tank and the platform 11. The tank can also move with the robot system 10, in particular when the quantity of reinforcing material to be deposited allows it.

Figure 15:
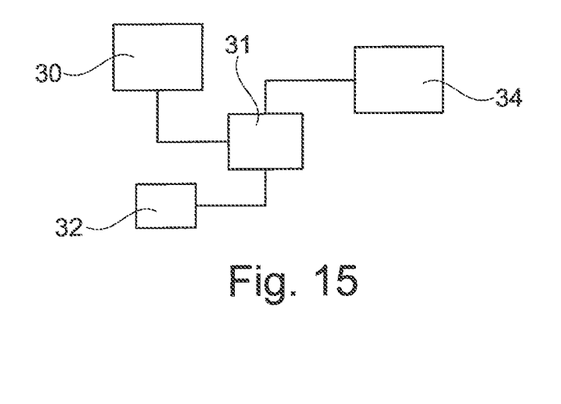
FIG. 15 is a block diagram illustrating the connection between different components of the robot system.

The robot system 10 comprises, in the example illustrated, a system 30 for acquiring relief data, shown schematically in FIG. 15, which enables it to determine the relief of the surface of the work on which the reinforcing structure needs to be produced so as to control the movement of the arm 12 and the platform 11 so that the reinforcing material may be deposited as desired.

This acquisition system 30 can be stationary or movable with respect to the arm 12 and/or the platform 11. It can also be external to the platform 11 and/or the arm 12, for example situated on a different machine, the positioning of which relative to the platform 11 and/or the arm 12 is known with sufficient accuracy.

The acquisition system 30 comprises, for example, one or more cameras and/or one or more radiofrequency devices, for example of the Lidar type.

The robot system 10 comprises a calculator 31 which receives the data generated by the acquisition system 30 and pilot-controls the platform 11, the arm 12, and the extrusion of the material accordingly.

This pilot-control takes place such that it respects a predefined algorithm for depositing the reinforcing material on the work.

As illustrated in FIG. 4, a reinforcing structure 100 is, for example, produced in the form of a shell with a thickness that reduces toward the edges, in a section made perpendicularly to the longitudinal direction of the work.

This algorithm for depositing reinforcing material is chosen depending on the mechanical stresses to which the work is exposed; the invention makes it possible, by virtue of the controlled extrusion, to deposit locally only the amount of reinforcing material required to provide the required mechanical strength at each point of the work such that a saving in material is made compared with some known repair techniques.

The robot system may comprise a human/machine interface 32 which makes it possible to input the depositing algorithm to be respected; this depositing algorithm can result from a prior analysis of the flaws in the work which need to be corrected.

The calculator 31 is preferably programmed such that the operation of depositing the reinforcing structure takes place independently with no human intervention to pilot-control the necessary movements of the extrusion nozzle 14.

The relief data are advantageously used in real time to ensure that the depositing of the first layer of material takes place properly, following the relief of the portion of the work to be reinforced and, for each subsequent layer, that of the relief of the last deposited layer, such that the depositing of a new layer on one or more previously deposited layers can result in the desired final geometry.

A layer is deposited on the previous one preferably depending on the acquisition of real-time data relating to the relief of the portion of the work already produced so as to be able to accordingly adapt the position of the nozzle.

The different layers are thus preferably deposited with the possibility of correcting in real time the trajectory of the nozzle 14 using the relief data.

The robot system 10 may thus be produced so as to be able to adapt itself to its surroundings. Deploying the robot system is then facilitated.

The reference numeral 34 in FIG. 15 refers to all of the actuators of the robot system, the functioning of which is controlled by the calculator 32 so as to perform the depositing of the reinforcing structure according to the desired geometry.

The movement of the platform 11 may be controlled based on the same relief data as those used to determine the movements of the arm 12. As an alternative, the acquisition of the relief data serves only to pilot-control the movements of the arm relative to the platform and the movement of the latter takes place independently of the relief of the portion of the work on which the reinforcing structure is produced.

The platform is, for example, moved in increments along the work, with the surface of the work being swept each time the platform halts by the nozzle 14 in order to deposit thereon a layer of reinforcing material depending on the geometry to be produced. The sweeping takes place the number of times needed to deposit the number of layers that allow the maximum desired thickness to be obtained.

During this sweeping, real-time acquisition of the relief data makes it possible to determine the movements of the arm which are required to move the nozzle at a predefined distance from the surface in contact with which the extrusion is to take place.

Once all the layers have been deposited, the platform is moved by a further increment. This movement may correspond to the width of an extruded strip so as to make it possible to obtain a continuous reinforcing structure along the work, as explained above.

When the platform 11 is on wheels or tracks, the calculator 31 can control the driving motor or motors of said platform so as to follow a predefined trajectory. This trajectory can be corrected by any means.

Guiding the platform 11 during its movement along the work may also be ensured mechanically by one or more rails or by guide wires.

The movement of the platform 11 may be assisted by an optical system, for example by means of one or more cameras, in particular different cameras from those used to reconnoiter the topology of the surface on which the reinforcing material is to be deposited.

Where appropriate, markers are positioned along the work in order to help the robot system to locate itself along the work. These markers may be produced so as to be detected by the relief data acquisition system. They may be passive or active optical markers.

The platform 11 may also be guided with the aid of a satellite locating system, for example of the DGPS type, and/or by land- or sea-based pseudolites.

Where appropriate, one or more RFID tags or other location transmitters, or one or more optical markers, may be arranged at at least one predefined point of the work and preferably at multiple points, which give the robot system a positional reference point and/or are capable of, for example, delimiting a zone of action of the robot system or helping it to orient itself.

Several locating techniques may, where appropriate, be combined for greater accuracy.

The robot system 10 preferably comprises an inertial platform and/or an odometer helping it to determine the position and/or the orientation of the platform 11 over time when it moves.

The invention makes it possible to produce reinforcing structures of any geometry adapted to the type of work to be repaired.

It is thus possible to produce the reinforcing structure with a variable inertia, for example which is greater where the stresses are highest.

Figure 5:
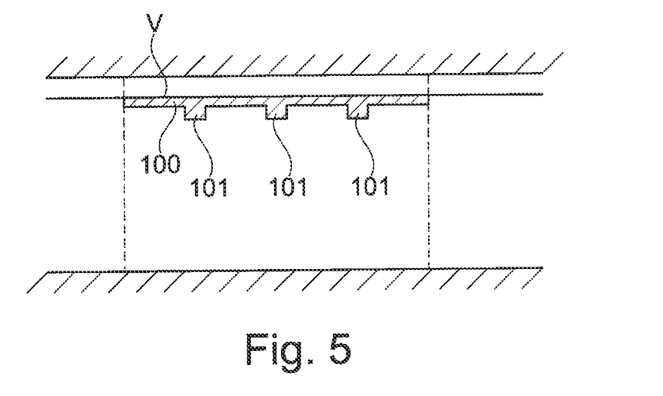
FIG. 5 illustrates the possibility of varying the inertia of the reinforcing structure produced with the aid of the robot system in FIG. 1.

For example, in the case of strengthening an arched roof, as illustrated in FIG. 5, the inertia may be varied along the work by producing ribs 101 spaced apart along the work.

Figure 6:
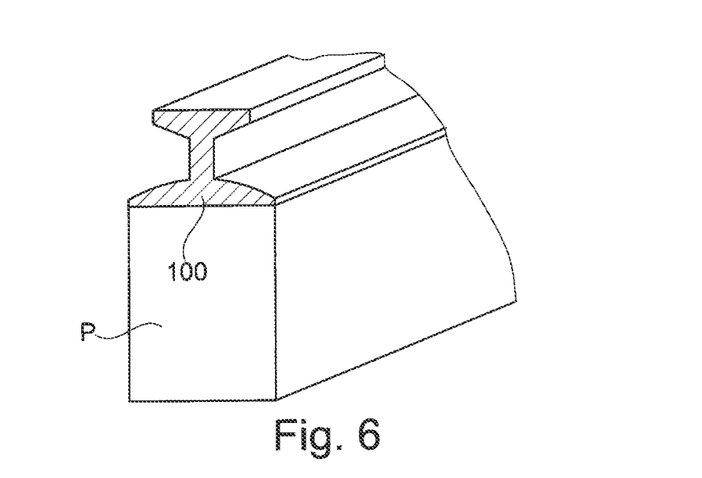
FIG. 6 shows another example of a reinforcing structure produced along a girder.

Illustrated in FIG. 6 is the possibility of strengthening a girder P with the aid of the reinforcing structure 100. The reinforcing structure 100 is itself, for example, in the form of a girder, for example with an I-section, the base flange being wider than the top flange.

Figure 7:
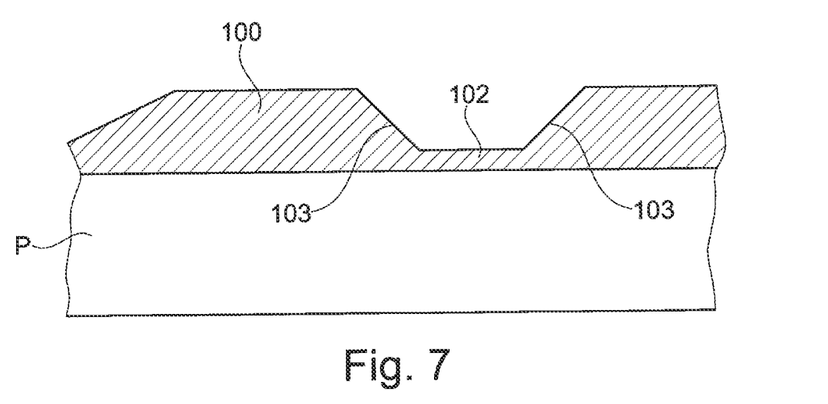
FIG. 7 illustrates the possibility of varying the inertia of the reinforcing structure in FIG. 5.
Figure 7A:
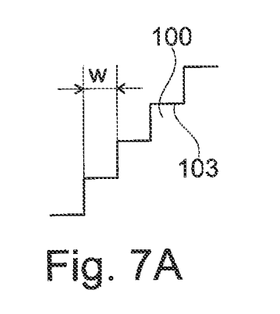
FIG. 7A illustrates a detail from FIG. 7.

The inertia of the reinforcing structure is varied along the girder, as illustrated in FIG. 7, with for example limited portions of reduced inertia 102 in the base flange. The transition 103 between the portions of greater inertia and those of lower inertia may be substantially linear on the scale of the work, a wide variety of transition profiles being achievable according to the invention. If the reinforcing structure 100 is observed closely, a graduated relief with steps of width w can be seen, as illustrated in FIG. 7A, because the depositing takes place in strips of width w. The height between two successive steps corresponds substantially to the difference in the number of layers deposited to produce the two corresponding stacks.

The dimensions and/or the morphology of the robot system 10 may be adapted depending on the geometry of the work to be repaired.

Figure 8:
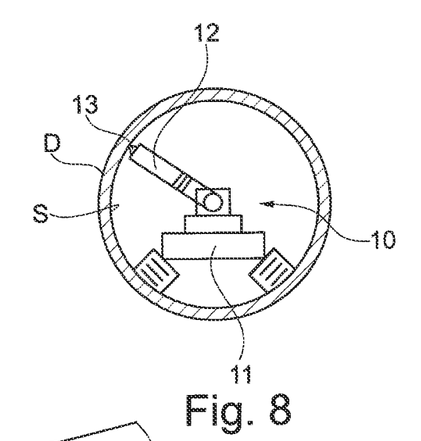
FIG. 8 shows schematically and partially another example of a robot system according to the invention, used when reinforcing a pipe.

In the example of a pipe D, which may or may not be capable of being visited, and which may or may not be buried, as illustrated in FIG. 8, the platform 11 can have wheels which are oriented so that they bear against the inner surface of the pipe so as to move along it. The arm 12 may be telescopic and comprise a segment which can rotate about an axis that coincides with that of the pipe. The nozzle 14 can be moved radially so as to be brought to the desired distance from the surface onto which the reinforcing material is to be extruded. Each strip is deposited on all or part of the circumference.

Figure 9:
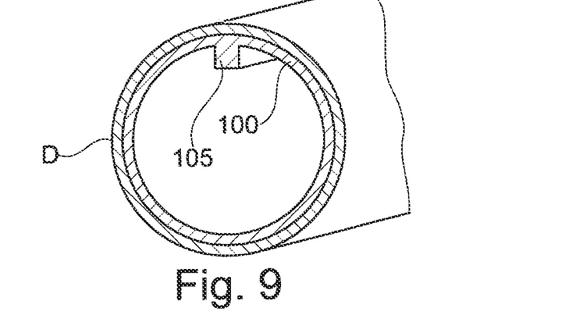
FIG. 9 shows an example of a reinforcing structure produced with the aid of the robot system in FIG. 8.

In such a case, the acquisition of the relief data may be limited, for example, to the acquisition of the distance from the axis of the pipe, in the radial direction, of the inner surface of the pipe S.

Where appropriate, a reinforcing rib 105 may be formed, projecting from the inner surface of the pipe, as illustrated in FIG. 9. Where appropriate, the robot system may make several passes in the pipe.

Figure 10:
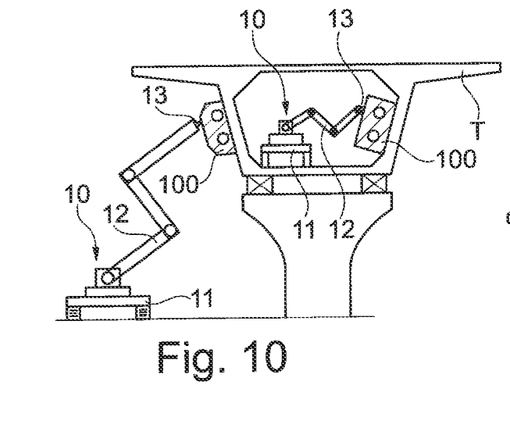
FIG. 10 shows schematically and partially examples of a robot systems according to the invention, used for producing knobs on a work such as a bridge.

Illustrated in FIG. 10 is the repair of a bridge with the aid of two robot systems working in parallel, one to produce a reinforcing structure 100 in the form of a knob outside the work, the other working inside the work.

Figure 12:
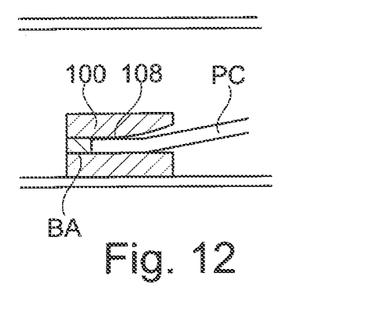
FIGS. 12 and 13 show a longitudinal cross-section of examples of profiles which may be given to the knobs.
Figure 13:
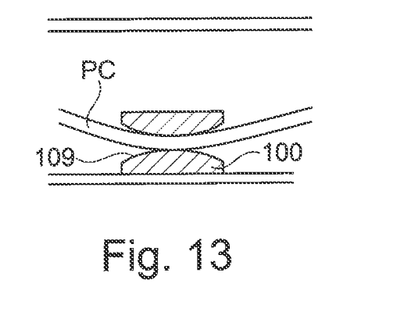

When the reinforcing structure is a knob, the latter may be produced with a passage 108 which enables a prestressing cable PC to be anchored with the aid of a bearing block, as illustrated in FIG. 12, or with a passage 109 with a splayed shape at its ends in order to deviate a prestressing cable PC.

Figure 11:
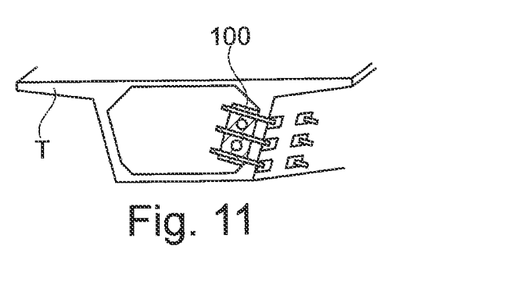
FIG. 11 shows a knob produced with the aid of the method according to the invention, after strapping to the structure of the work.

Once the knob has been produced, it can furthermore be strapped to the work, as illustrated in FIG. 11. In this case, the layers are deposited by extrusion so as to create holes for the subsequent installation of the strapping system.

Figure 14:
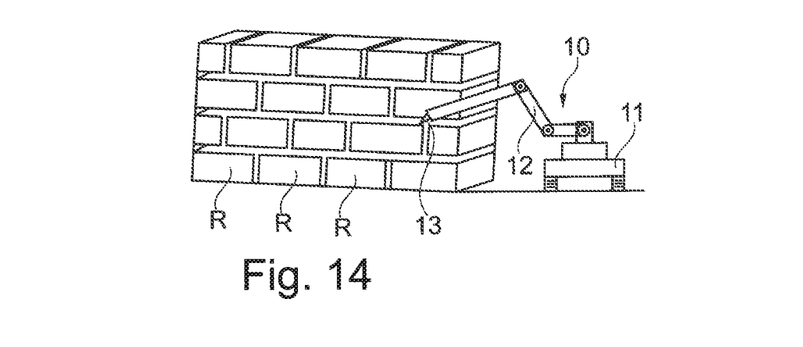
FIG. 14 shows schematically and partially another example of a robot system used to reinforce masonry.

Illustrated in FIG. 14 is the repair of masonry with the aid of a robot system 10 according to the invention. The robot system is then used for the repointing, between the stones R. Where appropriate, the robot system may be equipped with a tool for scraping out the existing joints before new joints are put in place by extrusion.

Figure 16:
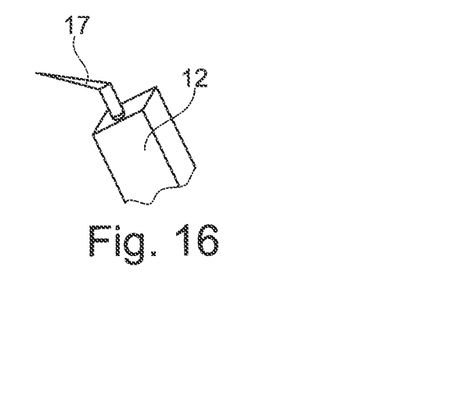
FIG. 16 illustrates the possibility of equipping the robot system with attached tools such as finishing tools like a spreading blade.

The robot system may be equipped with other tools and, for example, with a spreading blade 17, as illustrated in FIG. 16, so as to, for example, smooth the reinforcing material deposited by extrusion before it sets.

The invention is not of course limited to the examples which have just been given.

All types of civil engineering work can be repaired by virtue of the invention.

The invention claimed is:

1. A repair method for a civil engineering work, comprising depositing, directly onto a portion of the work to be repaired, a reinforcing structure formed from one or more successive layers of at least one reinforcing material which are each extruded in contact with a surface onto which the material is to be deposited, using a robot system, the material being extruded in strips and deposited with the aid of at least one extrusion head of the robot system having a slot-shaped outlet orifice for the material.

2. The method as claimed in claim 1, comprising smoothing the structure before the structure sets with the aid of a tool of the robot system.

3. The method as claimed in claim 2, said tool of the robot system being a spreading blade.

4. The method as claimed in claim 2, said tool being carried by an arm of the robot system carrying the at least one extrusion head.

5. The method as claimed in claim 1, comprising acquisition of relief data of a zone onto which the material is to be deposited and automatic pilot-controlling of the at least one extrusion head at least based on these relief data.

6. The method as claimed in claim 5, the relief data being acquired with the aid of an acquisition system of the robot system.

7. The method as claimed in claim 6, said acquisition system of the robot system being carried by an arm of the robot system carrying the at least one extrusion head.

8. The method as claimed in claim 7, in which the work contributes to guide the robot system mechanically by pressing the robot system against at least one surface defined by a girder of the work.

9. The method as claimed in claim 5, the acquisition of relief data comprising acquisition of relief data in real time, simultaneously with the extrusion.

10. The method as claimed in claim 5, the acquisition of relief data comprising acquisition of relief data prior to the extrusion.

11. The method as claimed in claim 5, the relief data being acquired with the aid of at least one optical sensor, by scanning with ultrasound or millimetric waves, and/or with the aid of at least one mechanical probe.

12. The method as claimed in claim 1, said at least one extrusion head being guided so as to respect a preprogrammed algorithm for said at least one reinforcing material.

13. The method as claimed in claim 1, the number of deposited layers lying between 2 and 100, and the thickness of each layer between 1 and 30 mm.

14. The method as claimed in claim 1, in which the number of layers deposited and/or the thickness of the layers deposited varies so as to produce a reinforcing structure with an inertia that varies.

15. The method as claimed in claim 1, the reinforcing structure being ribbed.

16. The method as claimed in claim 1, the reinforcing structure being a girder.

17. The method as claimed in claim 1, the reinforcing structure being a shell.

18. The method as claimed in claim 1, the reinforcing structure being a knob for distributing concentrated force.

19. The method as claimed in claim 18, the reinforcing structure being an anchor block for cables and/or tendons.

20. The method as claimed in claim 19, the reinforcing structure being an anchor knob for additional prestressing cables, for deviating external prestressing cables, support cables, or cables for anchoring damping devices.

21. The method as claimed in claim 1, the reinforcing structure being produced with one or more blockouts by adapting the location of the deposited layers.

22. The method as claimed in claim 1, in which the work contributes to guide the robot system mechanically as the robot system moves along the work when producing the reinforcing structure.

23. The method as claimed in claim 22, in which the work contributes to guide the robot system mechanically by pressing the robot system against at least one surface of the work.

24. The method as claimed in claim 1, the accuracy of the depositing of the reinforcing structure being greater than +/−0.5 cm in terms of thickness and/or in a direction parallel to the underlying surface of the work onto which the material is to be deposited.

25. The method as claimed in claim 1, the extruded material being a concrete.

26. The method as claimed in claim 25, the extruded material being a fiber-reinforced concrete.

27. The method as claimed in claim 25, the extruded material being a high-performance or ultra-high-performance concrete.

28. The method as claimed in claim 1, the extruded material comprising a resin.

29. The method as claimed in claim 1, the work being an arched roof.

30. The method as claimed in claim 29, the work being an arched roof of a tunnel or dome.

31. The method as claimed in claim 1, the work being a bridge.

32. The method as claimed in claim 31, the portion of the work to be repaired being part of the deck of the bridge.

33. The method as claimed in claim 1, the work being a pipe or a mast.

34. The method as claimed in claim 33, the robot system traveling along and inside of this pipe or this mast.

35. The method as claimed in claim 1, the work being made from masonry and the deposited structure being used for repointing.

36. The method as claimed in claim 1, the majority of the portion of the work to be repaired being made from concrete.

37. The method as claimed in claim 1, the portion of the work to be repaired being metal.

38. The method as claimed in claim 1, the portion of the work to be repaired being made from wood.

39. A repair method for a civil engineering work, comprising depositing, directly onto a portion of the work to be repaired, a reinforcing structure formed from one or more successive layers of at least one reinforcing material which are each extruded in contact with a surface onto which the material is to be deposited, using a robot system, the material being extruded in strips and deposited with the aid of at least one extrusion head of the robot system, said at least one extrusion head being guided so as to respect a preprogrammed algorithm for said at least one reinforcing material.

40. The method as claimed in claim 39, at least one extrusion head having a slot-shaped outlet orifice for the material.

* * * * *